COLOR TELEVISION SYSTEMS

Filed July 9, 1954

INVENTOR

Leslie Connock Jesty,

BY Baldwin & Wight

ATTORNEY

United States Patent Office 2,802,964

Patented Aug. 13, 1957

2,802,964

COLOR TELEVISION SYSTEMS

Leslie Connock Jesty, Burnham-on-Crouch, England, assignor to Marconi's Wireless Telegraph Company Limited, London, England, a British company Application July 9, 1954, Serial No. 442,301

Claims priority, application Great Britain April 10, 1953

5 Claims. (Cl. 313—92)

This invention relates to color television systems and more specifically to color television receivers and cameras of the kind in which pictures are reproduced or analyzed by means involving the division of the receiver screen or camera image, as the case may be, into color elements by means of color grids or color dot mosaics.

Systems of the kind referred to are well known and known systems of this nature involve considerable practical difficulties by reason of the use of the color grids or color dot mosaics. Most of these systems require very accurate registration of the scanning pattern with the color elements so that, for example, when a red signal is being transmitted or received the scanning spot is accurately behind a red element in the camera or receiver screen, as the case may be. If at the time a red signal is being transmitted or received the scanning spot is partly or wholly behind an element of another color e. g. a green or blue element the color reproduction will obviously be incorrect. Normal practice in systems of the kind referred to has hitherto been to make the sizes and numbers of the color elements for the different component colors—usually though not necessarily three—substantially equal. This practice, however, involves serious disadvantages which are not apparent at first sight and have not hitherto been appreciated.

According to this invention the total areas of the different color elements in a television apparatus of the kind referred to are not made substantially the same as hitherto but are made substantially different, the total area provided for the green elements being substantially greater than that provided for any other whereby a substantially closer approximation to brightness independent of color is obtained than would be obtained were the total areas the same for all colors.

In a system using green, red and blue component colors the largest area is allotted to green, the next to red and the smallest to blue, a satisfactory ratio being 8 (or 6) to green, 3 (or 4) to red, and 2 (or 1) to blue. In more general terms good results are obtainable by making the green area from one and a half to four times the red and from three to ten times the blue. Where there are four colors namely green, red, cyan and blue, a satisfactory ratio is 6 to green, 3 to red, 2 to cyan and 1 to blue.

Figure 1:
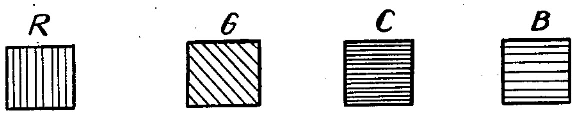
Figure 2:
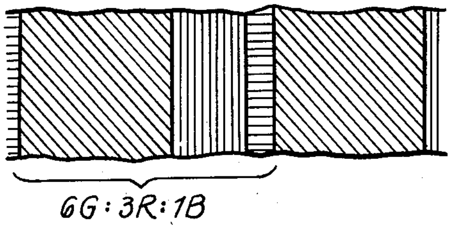
Figure 3:
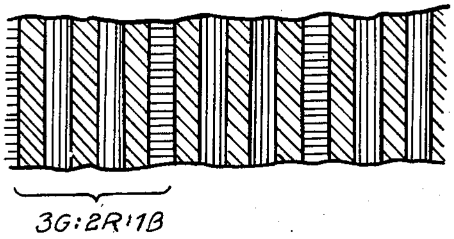
Figure 4:
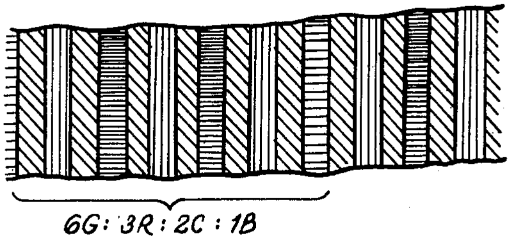
Figure 5:
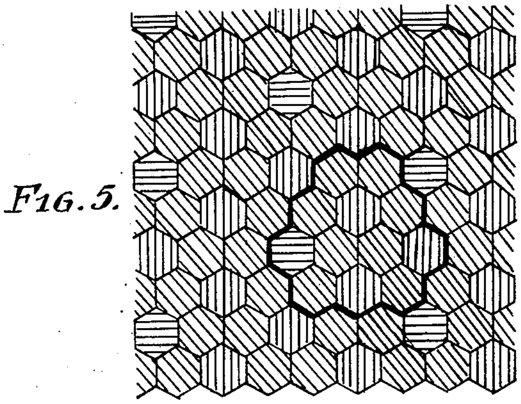

In the description which follows and in the accompanying drawing which schematically illustrates the invention, the letters G, R, C and B are used respectively to indicate green, red, cyan and blue and in the drawing these colors are represented by different cross hatchings as shown in the cross hatched lettered "key" squares which constitute Fig. 1; Fig. 2 shows one method of arranging the color line grids in carrying out the system of my invention; Fig. 3 shows a modified arrangement of the color line grids which may be used in the system of my invention; Fig. 4 shows a further modified arrangement of the color line grids which may be employed in the system of my invention; and Fig. 5 shows the application of the system of my invention to a three-color dot mosaic used in the viewing screen of a cathode ray in a color television system.

A number of possible methods of carrying out the invention will now be described together with advantages of the invention.

With a normal choice of component colors in a television system the brightness of the green elements is usually much the greatest, being in the region of from two to four times that of the red elements and five to ten times that of the blue. If, therefore, in a television receiver, the scanning spot is mis-registered with regard to the color mask there will also be a considerable error in the brightness as well as in the color of the reproduction. If, however, the brightness error is reduced the effective distortion as experienced by a viewer is much less noticeable for a given amount of mis-registration. Since green brightness is much the greatest as compared to the other colors, the present invention, by increasing the total area of the green elements, reduces any brightness error due to mis-registration.

Preferably in carrying out the invention the allocation of areas to the differently colored elements is made approximately in proportion to the relative brightness.

The allocation of total area to the variously colored elements are required by this invention may be done in various different ways, for example, by allotting different numbers of elements each of the same individual area to the different colors or by retaining the same number of elements for each color while making the individual areas of the elements different.

Figs. 2, 3 and 4 show respectively three ways of carrying out the invention using color line grids, parts of the grids being conventionally represented in each case.

In Fig. 2 the areas of the individual lines—more precisely their widths—are made unequal in the ratio of 6G:3R:1B so that in one scanning cycle (indicated by the bracket in Fig. 2) the ratio 6G:3R:1B is obtained.

Fig. 3 also represents a three color line grid in which, however, the grid lines are all of the same width but the numbers of lines allocated to the different colors are different. In Fig. 3, as will be seen, one scanning cycle involves a ratio 3G:2R:1B.

Fig. 4 represents a four color line grid (G, R, C and B) with colored lines of the same width but different numbers for each color, the ratio in the scanning cycle being 6G:3R:2C:1B.

Fig. 5 represents the invention as applied to a three color dot mosaic using the colors G, R and B. In this particular case the dots are all of the same size but different colors are allocated different numbers of dots. In Fig. 5 one cycle of the pattern is indicated by the heavy lining which outlines the twelve dots in that cycle from which it will be seen that the ratio is 8G:3R:1B.

In a cathode ray tube or viewing screen arrangement embodying the present invention the screen may be constructed of strips of fluorescent materials, fluorescing in the different component colors used or, in the case of a viewing screen, a viewing filter of strips of color glass or other filter material may be employed. It will be appreciated that any mis-registration of the scanning spot with the color stripes or elements will not produce anything like so serious a brightness error in the resultant picture as if present day practice of equality of allocation of areas as between the component colors were used.

When applied to a camera tube the basic method of the invention is the same though it operates in a somewhat different way. A camera tube of course analyzes the picture instead of synthesizing it. If the proportion and size of the color elements in the camera image is so arranged that they give equal responses for a white object, then, when scanning such a white object, the camera tube output will be exactly the same as if the color mosaic were removed from the image plane and a suitable reduction, compensating for the absorption due to the removed mosaic, were made for the input light intensity. This means that with white objects the resolving power of the camera is independent of the number of color elements in the mosaic. As the color of the incident light becomes more saturated so does the resolving power of the camera become more limited by the structure of the color mosaic. The accuracy of registration of a camera tube scanning spot with the elements of the color mosaic is therefore unimportant for white objects but becomes increasingly important for the more saturated colors. As the definition may be reduced in certain of these colors, however, the difficulties of registration may be correspondingly eased.

The invention may be applied to a limited number of color components in a color grid or mosaic as for example to the red and green primary component colors in a color grid or mosaic. In this particular case the brightness of the blue primary component color is deliberately kept low and each alternate blue element is replaced with a black element in order to produce a signal which is used to assist in achieving color synchronization. The efficiency of the whole arrangement would, however, be increased if the red and blue primary component colors were balanced and the present invention may be used to achieve this result by increasing the number of green elements. A suitable sequence for a color grid embodying both the present invention and the invention in copending applications Serial Nos. 330,302 and 435,672 is G, R, G, B, G, R, G, black, G . . . and so on, thus giving twice as many green elements as red.

While I have described my invention in certain of its preferred embodiments, I realize that modifications may be made, and I desire that it be understood that no limitations upon my invention are intended other than may be imposed by the scope of the appended claims.

I claim:

1. A display surface for color television tubes comprising a screen, wherein the total areas of the different color elements are made substantially different with the total area provided for the green elements substantially larger than that provided for any other, and wherein the total area provided for the blue elements is less than that of any other color, the color intensities in the areas of different colors being so chosen that the brightness is independent of color so that scanning at constant speed by an unmodulated scanning beam produces a result substantially equivalent to zero color (white), whereby the adverse effects of any color misregistration which may exist are rendered less noticeable.

2. A display surface for color television tubes as claimed in claim 1, wherein the total areas provided for the different color elements are in the ratio of 6 to green, 3 to red, 2 to cyan and 1 to blue.

3. A display surface for color television tubes as claimed in claim 1, wherein the screen is divided into a color line grid, each line being allocated to one color, the lines allocated to green being the widest and the lines allocated to blue being the narrowest.

4. A display surface for color television tubes as claimed in claim 1, wherein the screen is divided into a color line grid, each line being allocated to one color and the lines being of substantially equal width, there being more allocated to green than any other one color and there being less lines allocated to blue than any other one color.

5. A display surface for color television tubes as claimed in claim 1, wherein the screen is divided into a color dot mosaic, the dots being all of the same size and each dot being allocated to one color, there being more dots allocated to green than there are to dots of any other one color and less dots allocated to blue than there are to dots of any other one color.

References Cited in the file of this patent

UNITED STATES PATENTS

| | | |
|---|---|---|
| 2,429,849 | Somers | Oct. 28, 1947 |
| 2,619,608 | Rajchman | Nov. 25, 1952 |
| 2,669,671 | Headrick | Feb. 16, 1954 |
| 2,669,675 | Lawrence | Feb. 16, 1954 |
| 2,687,360 | Michaels | Aug. 24, 1954 |